United States Patent Office 2,863,833
Patented Dec. 9, 1958

2,863,833

FLANGE LUBRICANT

Hugh H. Jones and Frank E. Davidson, Jr., Birmingham, Ala.

No Drawing. Application May 24, 1957
Serial No. 661,279

6 Claims. (Cl. 252—27)

This application is a continuation-in-part of our copending application Serial No. 441, 621, filed July 6, 1954 (since abandoned), and relates to lubricants and particularly to a lubricant especially adapted to lubricate the flanges on flanged wheels, such as the wheels of locomotives and overhead cranes, and has for an object the provision of a composition of the character designated which shall have sufficient tackiness to adhere to the wheel flanges, and have wearing qualities commensurate with the demands of modern railroad operation.

A further object of our invention is to provide a lubricant for the flanges of locomotive wheels which shall have the property of penetrating the pores of the metal of the flanges and the rails against which they bear and thus provide improved lubrication, preventing pitting of the flanges and rails, and increase the period of service of the locomotive wheels.

As is well known in the art to which our invention relates, the flanges of locomotive wheels are subjected to extremely high friction, especially where they bear against the rails when the locomotive is rounding curves. As the surfaces of the flanges grind against the surfaces of the rails some of the high spots on the flanges grind against high spots on the rails, and local temperatures become very high because a considerable amount of heat must be dissipated over a very small area. As a result, with improper lubrication, welding takes place and the rupture of the metal occurs.

It is accordingly highly improtant for a lubricant for locomotive wheel flanges to have the property of resisting high temperatures as well as the property of permeating and remaining with the surface to be lubricated. It must also form easily sheared films on the flanges and should not run or spread onto the tread of the wheels thus causing slippage. The point of application as well as the composition of the lubricant thus becomes highly important.

In accordance with our invention we provide a lubricant in which the principal lubricating ingredients are graphite and commercial soapstone, or hydrated magnesium silicate which are solid at the temperatures created in service. We employ sulphur as a bonding agent for holding the components together and to provide the necessary hardness to give the lubricant the required wear. We have discovered that by employing as a plasticizer chlorinated diphenyl containing in combination from 42% to 68% (preferably approximately 54%) by weight of chlorine, we impart to the lubricant remarkable qualities whereby it apparently acts as a vehicle to penetrate or permeate the surfaces being lubricated, carrying with it the lubricating components of the mixture and providing the necessary easily sheared films between the contacting surfaces. The chlorinated diphenyl employed also has some lubricating properties and is mutually soluble with sulphur. While we do not clearly understand the physical or chemical effect that takes place, we have found by actual test over a long period of time that where a locomotive was operating under the severest conditions with respect to flange wear, welding or pitting of the flanges was entirely eliminated and that a period of service for the flanges was obtained which was several times any before realized.

In compounding our improved lubricant, we may employ from 54% to 70% by weight, of sulphur, hydrated magnesium silicate, by weight, from 10% to 22%; graphite, by weight, from 10% to 22%; and chlorinated diphenyl from 2 to 10%, the chlorinated diphenyl containing in combination preferably approximately 54% by weight of chlorine. A typical mixture adapted for normal flange lubrication is as follows:

60 parts by weight commercial flour of sulphur (99.5% pure)
15 parts by weight hydrated magnesium silicate or commercial soapstone
18 parts by weight graphite #4483 mesh (foundry facing)
5 parts by weight chlorinated diphenyl containing in combination from 42% to 68% by weight of chlorine The sulphur is heated in a suitable vessel to 120° to 150° C. or until the sulphur is liquid. The soapstone is added and the materials thoroughly mixed while holding the temperature between 120° and 150° C. Lastly the chlorinated diphenyl is added. Its viscosity is much lower at this temperature and consequently the viscosity of the mixture is lower after the addition and mixture of the latter compound.

The mixture while still hot can then be cast in suitable molds in the form of sticks. In use, these sticks of lubricant may be fed against the flanges of the locomotive wheels by means of a gravity feed flange lubricator.

Chlorinated diphenyl containing in combination as much as 68% by weight of chlorine is a solid at atmospheric temperatures, whereas chlorinated diphenyl containing in combination from 42% to 54% by weight of chlorine is liquid at atmospheric temperatures. Under severe service conditions requiring continued use of the air brake on a locomotive to control the speed or make frequent stops, we have found that the temperature of a locomotive's wheel rims will be raised to 200° F. or more. Where our improved lubricant is being compounded for use on locomotives subject to such high wheel rim temperatures, we preferably employ in the mixture a chlorinated diphenyl containing in combination up to 68% by weight of chlorine in order to provide a higher softening point for the lubricant and prevent spreading or "creeping" of the lubricant across the tread of the wheel.

The foregoing enumerated proportions are for use in outside temperatures ranging above 50° F. For lower temperatures, up to 25% increase of chlorinated diphenyl in the mixture produces a degree of hardness more practicable for the lower temperatures. We have found that in service, our improved lubricant greatly increases the period of service of flanges on which it is employed. It does not creep across the tread of a wheel and cause slipping nor does it pick up sand or brake shoe dust to produce an abrasive mixture. In use on locomotives we have found that it reduces to a minimum hot spots, cutting and peeling of the flanges and also prolongs the life of rails, switches, frogs and cross overs. It reduces the danger of rail climbing on curves, switches and frogs, thereby reducing derailments of the locomotive for that reason. The lubricant deposited on the flanges of the locomotive is transferred to the ball of the rail over which it is operated and is picked up by the flanges of following cars thereby increasing the life of all wheel flanges.

We wish it to be understood that we do not desire to be limited to the exact details of the composition described, for obvious modifications will occur to a person skilled in the art.

What we claim is:

1. A lubricant consisting essentially by weight; sulphur from 54% to 70%; hydrated magnesium silicate from 10% to 22%; graphite from 10% to 22%; and chlorinated diphenyl from 2% to 10%.

2. A lubricant consisting essentially by weight; sulphur from 54% to 70%; hydrated magnesium silicate from 10% to 22%; graphite from 10% to 22% and the remainder chlorinated diphenyl containing in combination from 42% to 68% by weight of chlorine.

3. A lubricant consisting essentially by weight; sulphur from 54% to 70%; hydrated magnesium silicate from 10% to 22%, graphite from 10% to 22%, and chlorinated diphenyl from 2% to 10%, the chlorinated diphenyl containing in combination from 42% to 68% by weight of chlorine.

4. A lubricant consisting essentially by weight; sulphur from 54% to 70%; hydrated magnesium silicate from 10% to 22%; graphite from 10% to 22% and chlorinated diphenyl from 2% to 10%, said chlorinated diphenyl containing in combination approximately 54% of chlorine by weight.

5. A flange lubricant consisting essentially of a mixture containing by weight approximately, sulphur 60%, hydrated magnesium silicate 15%, graphite 18% and the remainder chlorinated diphenyl containing in combination approximately 54% by weight of chlorine.

6. As a flange lubricant for use in outside temperatures below 50° F., the composition of claim 2 in which the amount of chlorinated diphenyl is increased up to 25%.

References Cited in the file of this patent

UNITED STATES PATENTS

| | | |
|---|---|---|
| 280,277 | Woodbury | June 26, 1883 |
| 2,160,577 | Maag | Sept. 11, 1937 |

OTHER REFERENCES

Klemgard: "Lubricating Greases" (1937), pages 718–19.